(12) United States Patent
Okumura

(10) Patent No.: US 6,445,278 B1
(45) Date of Patent: *Sep. 3, 2002

(54) ROTARY SENSOR CAPABLE OF DETECTING ROTATION ANGLE OF SHAFT TO BE DETECTED WITH HIGH ACCURACY

(75) Inventor: Hirofumi Okumura, Miyagi-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/470,863

(22) Filed: Dec. 23, 1999

(30) Foreign Application Priority Data

Dec. 24, 1998 (JP) .......................... 10-368036

(51) Int. Cl.⁷ ............................... H01C 10/32
(52) U.S. Cl. .................. 338/162; 338/167; 338/166; 338/174; 338/153
(58) Field of Search ................. 338/162, 166, 338/167, 174, 153, 190

(56) References Cited

U.S. PATENT DOCUMENTS 3,382,473 A * 5/1968 Benthuysen et al. ........ 338/166
3,996,549 A * 12/1976 Hufford et al. ............. 338/127
4,146,853 A * 3/1979 Kiyono et al. ............ 333/81 R
4,523,175 A * 6/1985 Sakurai ..................... 338/134
4,688,420 A * 8/1987 Minagawa ................. 338/162
4,806,809 A   2/1989 Kubota et al.
4,812,803 A * 3/1989 Hochholzer ................ 338/175
5,119,063 A * 6/1992 Nonnenmacher et al. ... 338/159
5,291,177 A * 3/1994 Chiu .......................... 338/166
5,781,099 A * 7/1998 Joschika et al. ............ 338/162
5,982,272 A * 11/1999 Masuda ..................... 338/162
6,016,098 A * 1/2000 Onishi et al. .............. 338/162

FOREIGN PATENT DOCUMENTS

| EP | 0 312 282 A2 | 4/1999 |
| GB | 2 236 191 A | 3/1991 |
| JP | Hei 4-17455 | 2/1992 |
| JP | Hei-8-61909 | 3/1996 |

* cited by examiner

*Primary Examiner*—Karl D. Easthom
(74) *Attorney, Agent, or Firm*—Brinks Hofer Gilson & Lione (57) ABSTRACT

In a rotary sensor of this invention, an angle detection member is composed of sliding pieces having contact portions on a rotation body side and a conductive pattern formed on a substrate arranged on a side opposite to the sliding pieces, the operation shaft has a flat projection portion which extends in a perpendicular direction from the center of rotation at the end, an groove portion extends in a direction perpendicular to the axial direction of the operation shaft, the projection portion is mated with the groove portion, and the contact portions of the sliding pieces are located at positions in a direction substantially perpendicular to the groove direction of the groove portion.

13 Claims, 5 Drawing Sheets

ROTARY SENSOR CAPABLE OF DETECTING ROTATION ANGLE OF SHAFT TO BE DETECTED WITH HIGH ACCURACY

BACKGROUND OF THE INVENTION

1. Field of the Invention

The present invention relates to a rotary sensor and, particularly to a rotary sensor capable of detecting a rotation angle transmitted from a shaft to be detected with high accuracy.

2. Description of the Related Art

Figure 7:
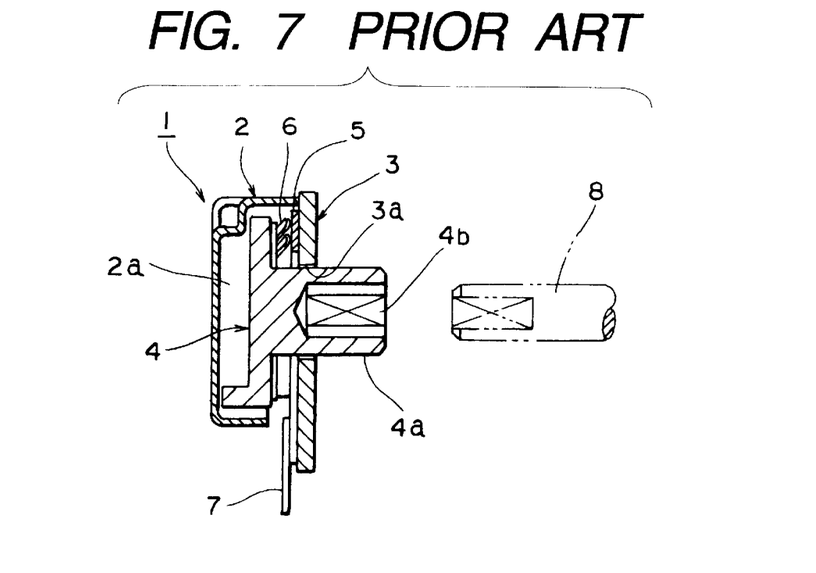
FIG. 7 is a sectional view of key parts of a prior art rotary sensor.

As shown in FIG. 7, a prior art rotary sensor comprises a substantially cylindrical housing 1, a case 2 having a cavity portion 2a therein, and a cover 3 for closing the cavity portion 2a by fixing this case 2 thereto.

A shaft hole 3a is formed in the cover 3, and a rotation body 4 having a shaft portion 4a at the center of rotation is stored in the cavity portion 2a. The shaft portion 4a is rotably inserted into the shaft hole 3a of the cover 3 and projects outward from the cover 3.

The diameter of the above shaft hole 3a is made slightly larger than the diameter of the shaft portion 4a and the shaft portion 4a is inserted into and mated with the shaft hole 3a.

An oval engagement hole 4a, for example, is formed in the end portion of the shaft portion 4a at the center of rotation and an operation shaft 8 which will be described hereinafter is inserted into this engagement hole 4b.

A resistor substrate 5 is installed on the cavity portion 2a side of the cover 3, and an unshown substantially U-shaped resistor pattern is formed on the surface of the resistor substrate 5 by printing. Sliding pieces 6 provided on the rotation body 4 are elastically brought into contact with the resistor pattern and slide over the resistor pattern when the rotation body 4 turns so that the resistance value changes with a predetermined curve.

A plurality of terminals 7 connected to the above resistor pattern are attached to a lower side in the figure of the above resistor substrate 5 by caulking or the like.

To detect the rotation angle of, for example, the throttle valve of a car using this prior art rotary sensor, the cover 3 is attached to a predetermined attachment member (not shown), and the operation shaft 8 which is a shaft to be detected shown by a two-dotted chain line and connected to the throttle valve of the car is press fitted in the engagement hole 4b of the shaft potion 4a.

The end portion of this operation shaft 8 is shaved oval and this oval end portion is engaged with the oval engagement hole 4b of the shaft portion 4a to transmit the rotation of the operation shaft 8 to the rotation body 4.

As the above operation shaft 8 is displaced or decentered in a thrust direction which is an axial direction and a radial direction perpendicular to the axial direction during the assembly of the parts of the throttle valve, the rotary sensor must absorb the displacement or decentering of the operation shaft 8.

The absorption of the displacement or decentering of the operation shaft 8 is carried out by making the diameter of the shaft hole 3a in the cover 3 larger than the diameter of the shaft portion 4a of the rotation body 4 so that even when the operation shaft 8 is displaced or decentered in a radial direction, the shaft portion 4a can turn the rotation body 4 smoothly without contact between the shaft portion 4a and the shaft hole 3a.

The above-mentioned prior art rotary sensor can detect the rotation angle of the operation shaft 8 because when the operation shaft 8 connected to the rotary shaft of a throttle valve or the like turns at a predetermined angle, the rotation body 4 turns smoothly, the sliding pieces 6 slide over the resistor pattern to change the resistance value, and an unshown control portion detects this change in resistance value.

However, as the above-mentioned prior art rotary sensor involves such a problem that, when the operation shaft 8 turns, the rotation body 4 is displaced or decentered by the displacement or decentering of the operation shaft 8, and the sliding pieces are shifted from the track of the resistor pattern with the result of large fluctuations in resistance value because the shaft portion 4a of the rotation body 4 is directly attached to the operation shaft 8 which is displaced or decentered in a thrust direction or radial direction. As a result, the rotation angle cannot be detected with high accuracy.

As means of eliminating the influence of the displacement of the operation shaft 8, there is a method in which the operation shaft 8 and the shaft portion 4a are in contact with each other on only one plane in a rotation direction to transmit only the rotation in one direction of the operation shaft 8 to the rotation body 4, and the rotation body 4 is turned along with the rotation of the operation shaft 8 by the spring pressure of a return spring or the like when the operation shaft 8 turns in another direction so that the operation shaft 8 and the shaft portion 4a turn together. However, this method requires such a part as a return spring or the like, thereby increasing the number of parts and boosting costs.

SUMMARY OF THE INVENTION

It is an object of the present invention to provide a rotary sensor which solves the above problems and can detect a rotation angle with high accuracy by absorbing the displacement or decentering of the operation shaft 8 even if the operation shaft 8 is displaced or decentered.

According to a first aspect of the present invention, there is provided a rotary sensor comprising a housing, a rotation body which is rotably supported by the housing and has on the front surface an engagement portion for movably guiding a shaft to be detected along a first straight line, a substrate having a conductive pattern and attached to the housing, and contact portions which are provided on the rear surface of the rotation body, are in sliding contact with the conductive pattern and are located at positions in a direction perpendicular to the first straight line. Therefore, since the rotation body does not turn even if the shaft to be detected is displaced or decentered, it is possible to provide a rotary sensor which can minimize the influence of the displacement or decentering of the shaft upon the output of the rotary sensor and can detect the rotation angle or rotation direction of the shaft to be detected with high accuracy.

According to a second aspect of the present invention, there is provided a rotary sensor, wherein a groove into which a flat projection formed at the end of the shaft to be detected is inserted is formed in the rotation body to form the above engagement portion for the operation shaft. Therefore, the engagement portion can be formed with a simple structure.

According to a third aspect of the present invention, there is provided a rotary sensor, wherein the groove is formed by a pair of walls which are opposed to each other with the center of the rotation of the rotary body interposed therebetween. Therefore, the engagement portion can be formed with a simple structure.

According to a fourth aspect of the present invention, there is provided a rotary sensor, wherein a flat projection to be inserted into a groove formed in the end of the shaft to be detected is formed on the rotation body to form the engagement portion for the operation shaft. Therefore, the engagement portion can be formed with a simple structure.

According to a fifth aspect of the present invention, there is provided a rotary sensor, wherein the conductive pattern is formed of ring-shaped resistors. Therefore, even when the positions of sliders are changed in a radial direction, the output rarely changes. Therefore, the rotation angle or rotation direction of the shaft to be detected can be detected with high accuracy.

According to a sixth aspect of the present invention, there is provided a rotary sensor, wherein the conductive pattern is formed of a radiate pattern and the center of the radiate pattern is located at the same position as the center of the rotation of the rotation body. Therefore, even when the positions of the sliders change in a radial direction, the output does not change. Therefore, the rotation angle or rotation direction of the operation shaft can be detected with high accuracy.

The above and other objects and advantages of the present invention will become apparent from the following description when taken into conjunction the accompanying drawings.

DETAILED DESCRIPTION OF THE PREFERRED EMBODIMENTS

Figure 1:
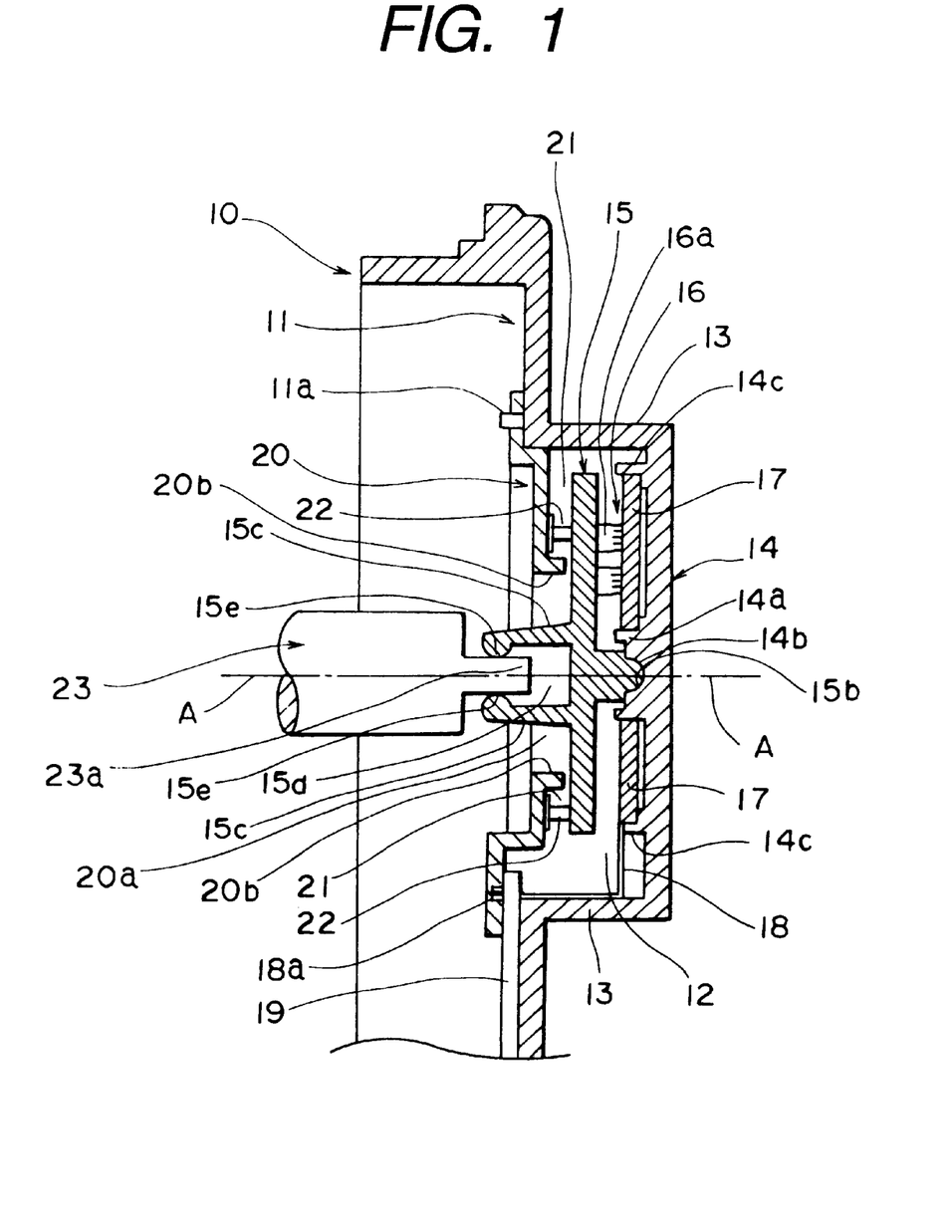
FIG. 1 is a sectional view of keyparts of a rotary sensor according to the present invention.
Figure 2:
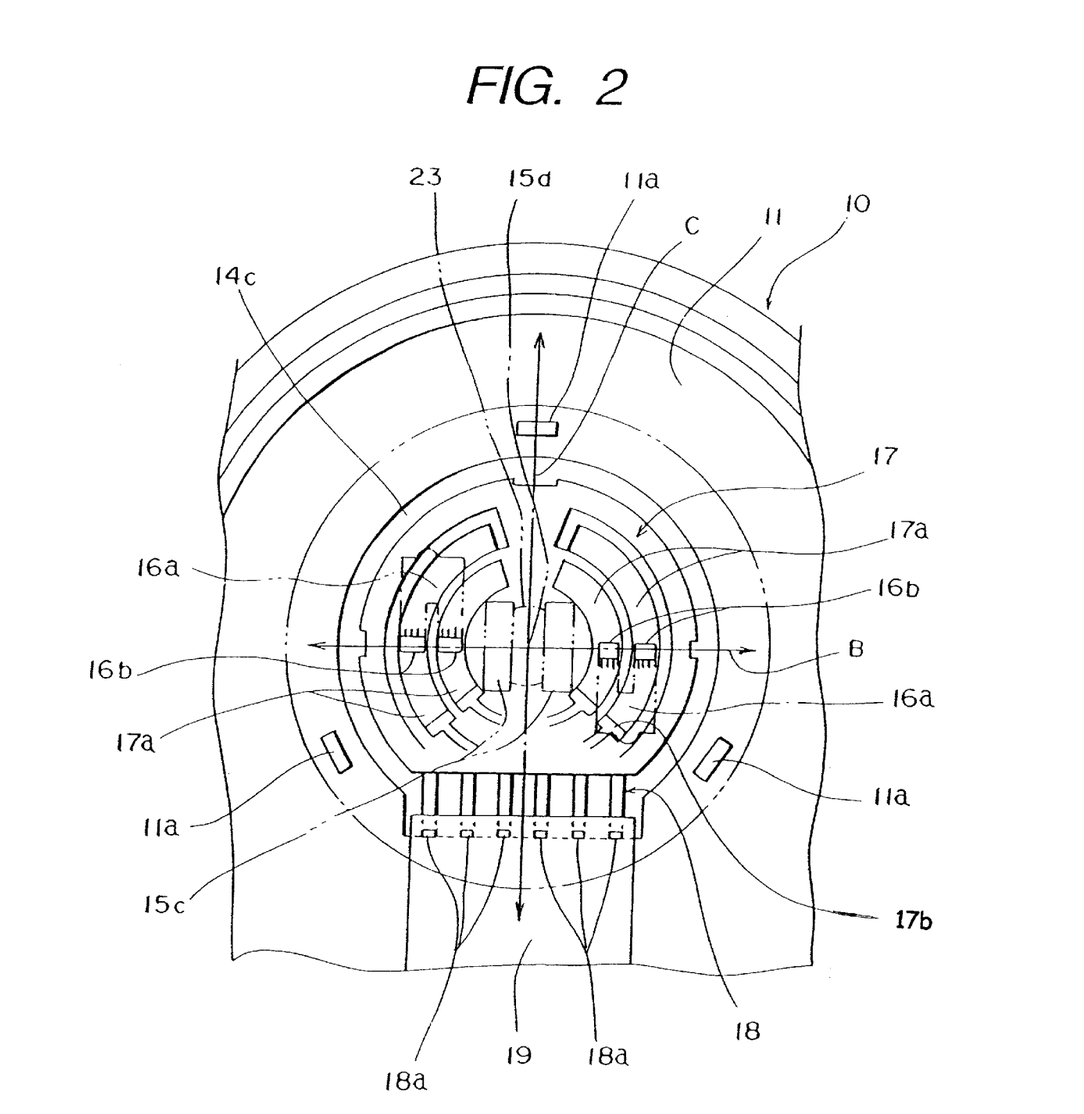
FIG. 2 is a schematic plan view for explaining the relationship among key parts according to the present invention.
Figure 3A:
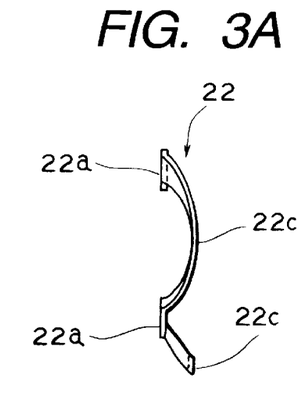
FIGS. 3A and 3B are a side view and a front view of an elastic member, respectively, according to the present invention.
Figure 3B:
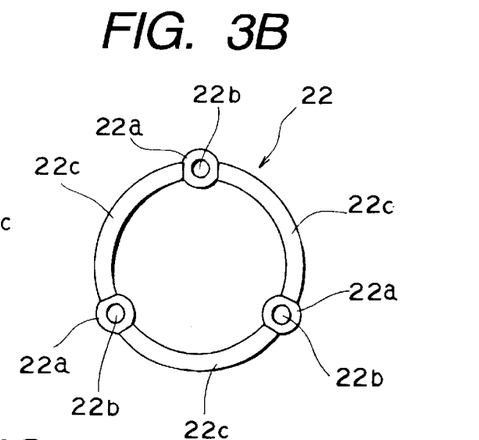
Figure 4:
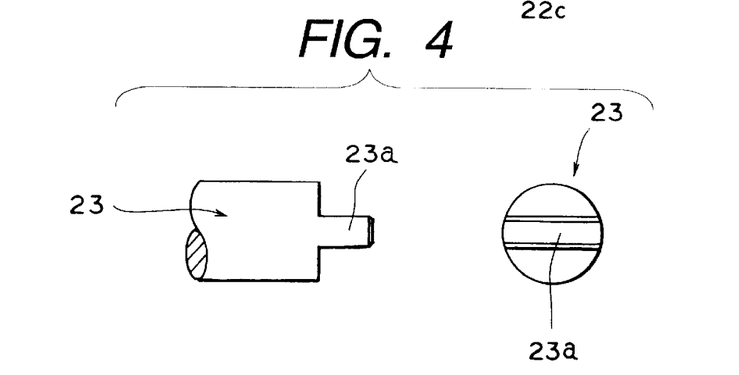
FIG. 4 is a side view (on the left) and a front view (on the right) of key portions of an operation shaft, respectively, according to the present invention.
Figure 5:
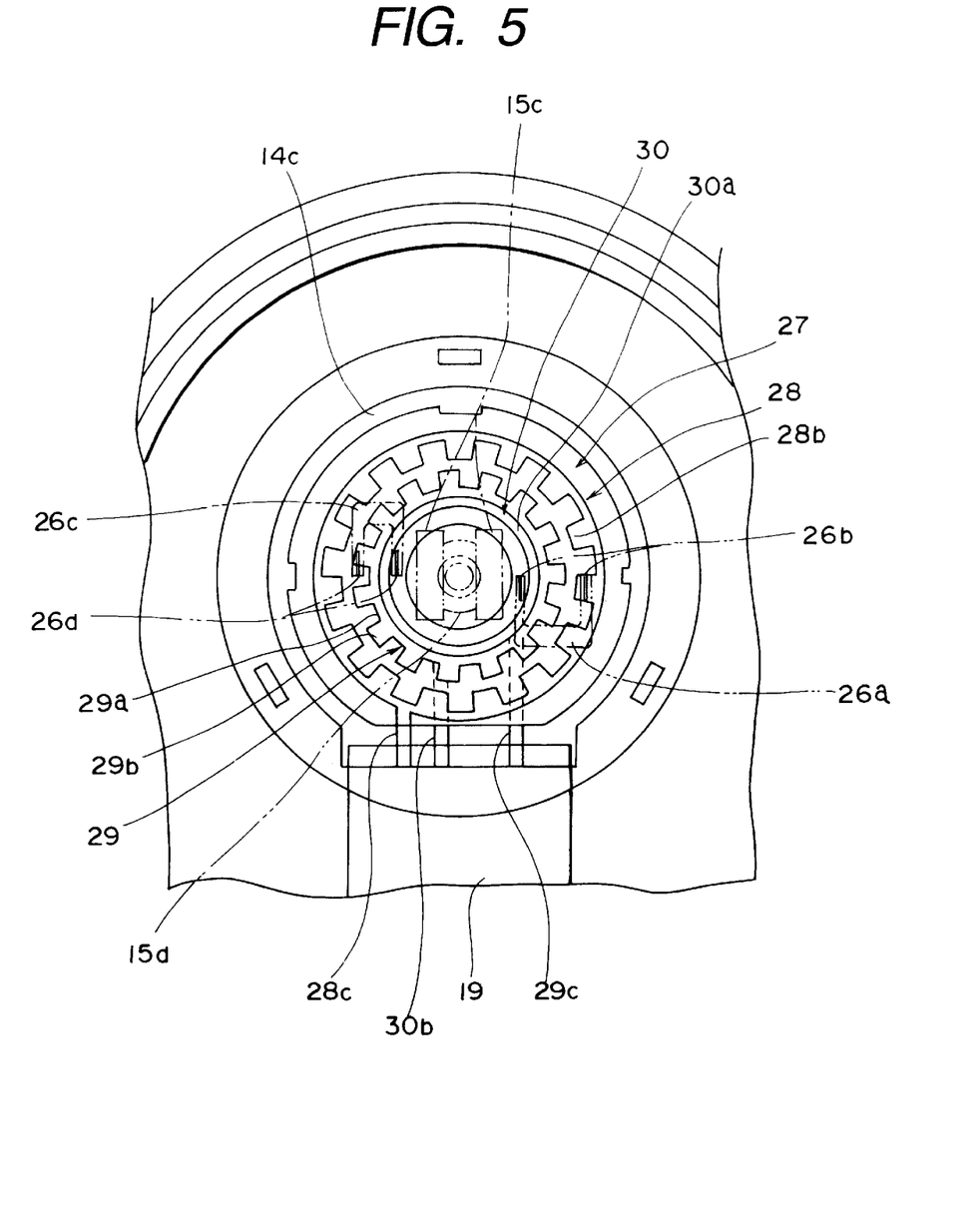
FIG. 5 is a schematic plan view for explaining the relationship among key parts according to another embodiment of the present invention.
Figure 6:
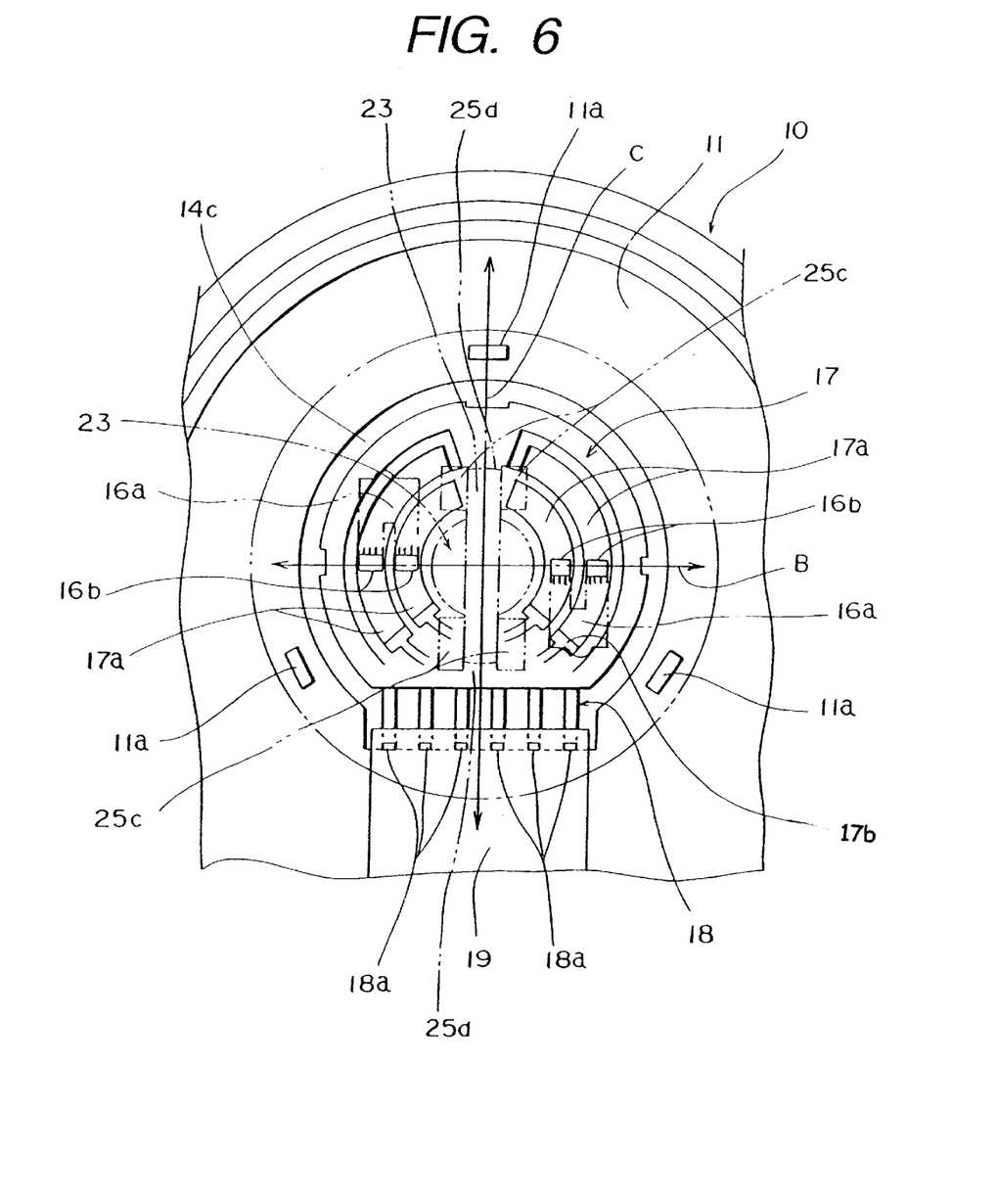
FIG. 6 is a schematic plan view for explaining the relationship among key parts according to still another embodiment of the present invention.

A rotary sensor according to an embodiment of the present invention will be described hereinunder with reference to the accompanying drawings. FIG. 1 is a sectional view of key parts of the rotary sensor of the present invention, FIG. 2 is a schematic plan view for explaining the positional relationship of key parts of the present invention, FIGS. 3A and 3B are diagrams of the elastic member of the present invention, FIGS. 4A and 4B are schematic diagrams of the end portion of the operation shaft of the present invention, and FIGS. 5 and 6 are schematic plan views of other embodiments of the present invention.

As shown in FIG. 1, the rotary sensor of the present invention comprises a housing 10 which is shaped like a box (not shown) and made from a resin material or the like, and the bottom portion of the housing 10 is covered by a bottom wall 11. Part of the bottom wall 11 is projected to the right side of the figure to form a substantially cylindrical storage portion 12 which is defined by a side wall 13 and a bottom plate 14.

A support portion 14a is formed substantially at the center of the bottom plate 14 on the storage portion 12 side in such a manner that it projects toward the storage portion 12 and a hemispherical bearing portion 14b which is a recessed portion is formed in the center portion of the support portion 14a.

A substrate holding portion 14c for attaching a substrate 17 which will be described hereinafter is formed on the storage portion 12 side of the bottom plate 14 near the side wall 13.

In the storage portion 12, a rotation body 15 made of a substantially disk-like resin material is rotably stored with a center line A as the center of its rotation.

A pair of engagement walls 15c and 15c opposed to each other with the center line A therebetween are formed on the left side in the figure of the rotation body 15 and a groove portion 15d having a predetermined width and extending in a direction perpendicular to the center line A is formed between the pair of engagement walls 15c and 15c.

Substantially semi-circular projection portions 15e and 15e are formed at the ends of the engagement walls 15c and 15c in such a manner that they project toward the groove portion 15d side.

A shaft portion 15b whose end portion is substantially hemispherical and projects from the center of rotation is formed on the other right side in the figure of the rotation body 15.

This shaft portion 15b is rotably pivoted on the bearing 14b of the bottom plate 14 and cannot move in a direction perpendicular to the center line A.

Sliding pieces 16a which are made of a metal plate having spring properties as one of components constituting an angle detection member 16 are attached to a side to which the shaft portion 15b is formed of the rotation body 15. As shown in FIG. 2, the sliding pieces 16a have contact portions 16b which are in sliding contact with a substantially center portion of a conductive pattern composed of resistors 17a and formed on the substrate 17 which will be described hereinafter, and the contact portions 16b are located at positions in a direction substantially perpendicular to the groove direction of the groove portion 15d of the rotation body 15.

The insulating substrate 17 is positioned and fixed to the substrate holding portion 14c of the bottom plate 14 on a side opposite to the side to which the sliding pieces 16a are attached of the rotation body 15 by caulking or the like.

The conductive pattern is formed on the surface of the substrate 17 and composed of resistors 17a consisting of substantially circular arc resistor patterns and collecting patterns formed by printing or the like, and the contact portions 16b of the sliding pieces 16a are sliding contacted to the substantially center portions in a width direction of the resistors 17a. The above angle detection member 16 consists of the sliding pieces 16a and the substrate 17 having the resistors 17a.

At a lower end portion of the substrate 17 shown in FIG. 1, a plurality of substantially L-shaped terminals 18 are connected to the respective resistors 17a, drawn from the end surface of the substrate 17 and guided along the inner surface of the side wall 13, and the end portions 18a of the terminals 18 are drawn to the left side of the figure and soldered to an unshown lead pattern formed on an FPC 19.

An upper plate 20 for covering the storage portion 12 is provided on the left side in FIG. 1 of the rotation body 15, attached to attachment projections 11a formed at a plurality of sites of the bottom wall 11 and fixed to the bottom wall 11 by thermally caulking or the like.

An opening portion 20a in which the pair of engagement walls 15c and 15c of the rotation body 15 are situated are formed in the center portion of the upper plate 20, and a cylindrical support wall 20b is formed around this opening portion 20a in such a manner that it projects toward the rotation body 15. The support wall 20b prevents the rotation body 15 from being inclined at an angle more than a predetermined angle.

A gap 21 is formed between the upper plate 20 and the rotation body 15, and an elastic member 22 is placed in the gap 21. This elastic member 22 is a ring-shaped plate material having spring properties, such as a phosphor bronze plate. As shown in FIG. 3, flat ring-shaped attachment portions 22a are formed in the elastic member 22 at a plurality of sites and an attachment hole 22b is formed in each of the attachment portions 22a.

Some parts of the ring-shaped elastic member 22 are curved to form a plurality of elastic portions 22c. The attachment holes 22b are caulked to projections (not shown) formed on the rotation body 15 and the elastic member 22 is attached to the inner wall of the upper plate 20. The spring pressure of the elastic portions 22c is made larger than the spring pressure of the sliding pieces 16a.

The plurality of elastic portions 22c of the elastic member 22 are always elastically contacted to the rotation body 15, the rotation body 15 is thereby pressed toward the bottom plate 14 side, the shaft portion 15b is supported by the bearing portion 14b of the support portion 14a, the rotation of an operation shaft 23 which will be described hereinafter is transmitted, and the rotation body 15 is rotably stored in the storage portion 12.

To detect the rotation angle of the throttle valve of a car or the like using the rotary sensor of the present invention constituted as described above, the housing 10 is first attached to an throttle body (not shown).

Then, as shown in FIG. 1, the operation shaft 23 which is the shaft to be detected and connected to the rotation shaft (not shown) of the throttle valve is inserted into the groove portion 15d formed of the pair of engagement walls 15c and 15c of the rotation body 15 and placed in position.

This operation shaft 23 is formed like a cylindrical rod and has a flat projection portion 23a which extends in a direction perpendicular to the center line A as the center of rotation at the end so that it can swing at a predetermined rotation angle.

The above projection portion 23a is inserted into the groove portion 15d of the rotation body 15 and the rotation body 15 is turned by the rotation of the operation shaft 23.

Although the rotation angle detection range of the above angle detection member 16 is approximately 100° when the angle detection sensor of the present invention is used as a throttle sensor, this rotation angle detection range is not fixed and varies according to the type of sensor and there is available a sensor capable of detecting an endless range of rotation angle.

The above operation shaft 23 is displaced in a thrust direction which is an axial direction, or displaced or decentered in a radial direction which is optional direction perpendicular to the axial direction for such a reason as the accuracies of parts of the throttle valve.

The rotary sensor of the present invention is able to detect the rotation angle without an error or rotation angle with a little error if any, or the rotation direction of the operation shaft 23 by absorbing the displacement or decentering of the operation shaft 23.

That is, since the rotary sensor of the present invention is constituted as shown in FIG. 2 that the contact portions 16b of the sliding pieces 16a are situated at positions in a direction substantially perpendicular to the groove direction (shown by an arrow C) of the groove portion 15d and are in sliding contact with the resistors 17a, when the operation shaft 23 is decentered and the center of the rotation of the operation shaft 23 is displaced in a direction shown by an arrow B, the rotation body 15 is also displaced by the decentering of the operation shaft 23, and the contact portions 16b of the sliding pieces 16a move in a direction shown by the arrow B within the range of the width direction of each of the resistors 17a.

Since the distance between an electrode 17b and the contact portion 16b does not change at this point, there is almost no change in resistance value.

Since the contact portions 16b are situated substantially at the centers in a width direction of the resistors 17a, even if the operation shaft 23 is displaced or decentered, the contact portions 16b and the resistors 17a are not shifted from each other and do not become nonconductive.

Since the projection portion 23a of the operation shaft 23 moves in the groove direction of the groove portion 15d when the displacement or decentering of the operation shaft 23 is in the direction shown by the arrow C which is the groove direction of the groove portion 15d shown in FIG. 2, the displacement or decentering in the direction shown by the arrow C of the operation shaft 23 is not transmitted to the rotation body 15, thereby eliminating its influence upon the resistance value.

Further, as the end portion of the shaft portion 15b of the rotation body 15 is supported by and mated with the bearing portion 14b of the bottom plate 14, even if the operation shaft 23 is displaced or decentered in a radial direction, the rotation angle of the operation shaft 23 can be detected with high accuracy.

When the operation shaft 23 is displaced in a thrust direction (axial direction), as shownin FIG. 1, the projection portion 23a of the operation shaft 23 situated in the groove portion 15d can freely move in the axial direction of the center line A in the groove portion 15d and can absorb the displacement of the operation shaft 23 in a thrust direction.

According to this embodiment of the present invention, the conductive pattern is formed of the resistors 17a. In another embodiment of the present invention, the conductive pattern may be formed of an electrode having a plurality of pulse generation portions formed radiately and having their center at the center of rotation as shown in FIG. 5, which may be used in an encoder type rotary sensor.

In this encoder type rotary sensor, the conductive pattern is formed of an electrode having a plurality of pulse generation portions, output obtained by bringing the contact portions 26b and 26d of sliding pieces 26a and 26c attached to the rotation body 15 into sliding contact with the plurality of pulse generation portions intermittently is processed by a CPU (not shown), and the rotation angle or rotation direction of the operation shaft 23 is detected.

The conductive pattern formed of the encoder type electrode as described above consists of an A phase electrode 28, B phase electrode 29 and common electrode 30 formed on the substrate 27 as shown in FIG. 5.

The above A phase electrode 28 has a ring-shaped A phase pattern 28*a* near the periphery of the substrate, and this A phase pattern 28*a* has a plurality of comb tooth-like pulse generation portions 28*b* which are formed radiately on an inner side and have their center at the center of the rotation of the rotation body 15.

An A phase terminal 28*c* connected to the A phase pattern 28*a* is drawn to the outside.

The B phase electrode 29 has a ring-shaped B phase pattern 29*a* on an inner side of the A phase pattern 28*a*, this B phase pattern 29*a* has a plurality of comb tooth-like pulse generation portions 29*b* which are formed radiately on an outer peripheral side and have their center at the center of the rotation of the rotation body 15, and the pulse generation portions 29*b* are shifted from the pulse generation portions 28*b* of the A phase pattern 28*a* at a predetermined angle.

A B phase terminal 29*c* connected to the B phase pattern 29*a* is drawn to the outside.

The common electrode 30 has a common pattern 30*a* formed like a ring on an inner side of the B phase pattern 29*a*, and a common terminal 30*b* connected to the common pattern 30*a* is drawn to the outside.

The A phase pattern 28*a*, B phase pattern 29*a* and common pattern 30*a* are all made of a metal sheet and embedded in the substrate 27 in such a manner that they are exposed from the surface of the substrate 27.

The common electrode 30 and the A phase electrode 28 are connected to each other by the A phase sliding piece 26*a* attached to the rotation body 15. That is, one of the contact portions 26*b* of the A phase sliding piece 26*a* is brought into sliding contact with the common electrode 30 and the other contact portion 26*b* is brought into sliding contact with the pulse generation portions 28*b* of the A phase electrode 28 intermittently.

The contact portions 26*b* are attached to the rotation body 15 such that they are located substantially at the center of the projection portion of each of the comb tooth-like pulse generation portions 28*b*.

The common electrode 30 an d the B phase electrode 29 are connected to each other by the B phase sliding piece 26*c* attached to the rotation body 15. That is, one of the contact portions 26*d* of the B phase sliding piece 26*c* is brought into sliding contact with the common electrode 30 and the other contact portion 26*d* is brought into sliding contact with the pulse generation portions 29*b* of the B phase electrode 29 intermittently.

The contact portions 26*d* are attached to the rotation body 15 such that they are located substantially at the center of the projection portion of each of the comb tooth-like pulse generation portions 29*b*.

Also in this encoder type rotary sensor according to another embodiment of the present invention, even when the operation shaft 23 is displaced in a thrust direction, or displaced or decentered in a radial direction, the rotation angle or rotation direction of the operation shaft 23 can be detected with high accuracy by absorbing the displacement or decentering.

According to the embodiment of the present invention, the end of the shaft portion 15*b* of the rotation body 15 is supported by and mated with the bearing 14*b* of the bottom plate 14. When the rotation body 15 is elastically urged toward one side (the operation shaft 23 side shown in FIG. 1) and the operation shaft 23 is mated with the groove portion 15*d* of the rotation body 15, even if the operation shaft 23 is displaced or decentered, the rotation angle or rotation direction of the operation shaft 23 can be detected with high accuracy by absorbing the displacement or decentering.

As shown in FIG. 6, the engagement walls 25*c* and 25*c* may be formed at two locations in a direction shown by an arrow C which is the groove direction, and the projection portion 23*c* of the operation shaft 23 may be mated with groove portions 25*d* and 25*d* formed by these engagement walls 25*c* at the two locations.

That is, the rotary sensor of the present invention is constituted such that the groove portions 25*d* extend in a direction perpendicular to the axial direction of the operation shaft 23, the projection portion 23*a* is mated with the groove potions 25*d*, and the contact portions 16*b* of the sliding pieces 16*a* are located at positions in a direction (shown by an arrow B) substantially perpendicular to the groove direction (shown by an arrow C) of the groove portions 25*d*.

The groove portions 25*d* may be formed in the operation shaft 23 and the projection portion 23*a* may be formed in the rotation body 15.

What is claimed is:

1. A rotary sensor for measuring the rotation angle of a shaft, said shaft being provided at its one end with a plate-like protrusion, said rotary sensor comprising:

a housing, said housing having a support bearing;

a rotation body which is rotatably supported by the housing, said rotation body comprising a disc-like rotation plate having sliding pieces on a rear surface thereof, a shaft portion integral with said disk-like rotation plate and projecting outwardly from the rear surface thereof, said shaft portion disposed along a center of rotation of the rotation plate, said shaft portion being separate from the shaft whose rotation angle is to be measured, and an engagement portion projecting outwardly from a front surface of the rotation plate for engaging the plate-like protrusion of the shaft whose rotation angle is to be measured, said engagement portion being disposed along the center of rotation of the rotation plate and having an axis that is coincident with an axis of said shaft portion, said shaft portion comprising a lower end having an arcuate sectional configuration, the lower end being pivotally supported by the support bearing of the housing, said engagement portion being disposed so as to permit the shaft whose rotation angle is to be measured to be displaced relative to the rotation body in one of a lateral direction extending along the axis of said shaft portion and a radial direction extending outwardly from the center of rotation of the rotation plate of said rotation body, said engagement portion comprising at least a pair of spaced apart engagement walls having inwardly facing ridges, said ridges having an arcuate sectional configuration adapted to engage the plate-like protrusion on the end of the shaft;

a substrate having a conductive pattern attached to the housing, said conductive pattern being annularly disposed about the support bearing of the housing and configured to engage the sliding pieces on the rear surface of the rotation plate, said sliding pieces having contact portions in sliding contact with the conductive pattern and adapted to follow a displacement of the shaft whose rotation angle is to be measured in a direction which perpendicularly crosses, on the plane of the substrate, the radial displacement of the shaft whose rotation angle is to be measured; and an elastic member provided in said housing and adapted to bring the lower end of the shaft portion of the rotation body into elastic contact with the bearing portion of the housing so as to be universally rotatable around the pivotal support point of the support bearing in conformity with the radial displacement of the shaft whose rotation angle is to be measured.

2. The rotary sensor according to claim 1, wherein the conductive pattern is formed of ring-shaped resistors.

3. The rotary sensor according to claim 1, wherein the conductive pattern comprises a ring-like pattern and a plurality of pulse generating electrode portions that protrude inwardly in a comb-teeth-like fashion in the radial direction of the rotation body, and wherein the contact portions of said sliding pieces intermittently come into sliding contact with said pulse generating electrode portions.

4. A rotary sensor according to claim 1, wherein said conductive pattern comprises a ring-like pattern and a plurality of pulse generating electrode portions that protrude outwardly in a comb-teeth-like fashion in the radial direction of the rotation body, and wherein the contact portions of said sliding pieces intermittently come into sliding contact with said pulse generating electrode portions.

5. A rotary sensor according to claim 1, wherein said elastic member comprises a resilient ring-like plate curved in a wave-like fashion, and wherein said elastic member is disposed within a gap between the front surface of the rotation plate and an upper plate connected to said housing.

6. A rotary sensor according to claim 1, wherein said pair of engagement walls comprise a first engagement wall and a second engagement wall, said first engagement wall and said second engagement wall being disposed on opposite sides of center of rotation of the rotation plate.

7. A rotary sensor according to claim 1, wherein the shaft whose rotation angle is to be measured comprises an operation shaft connected to a rotational shaft of a throttle valve of an automotive engine.

8. A rotary sensor engageable with an engagement end provided on an end of an operation shaft of an apparatus for measuring the angle of rotation of said operation shaft about an axis thereof, said rotary sensor comprising:

a housing mounted to said apparatus;

a rotation body rotatably supported by the housing and having an axis which intersects the axis of said operation shaft, said rotation body having a holder provided with sliding pieces on a lower surface thereof, said sliding pieces having contact portions, and an engagement portion for mating engagement with the engagement end of said operation shaft, said engagement portion integrally formed with said holder and adapted to move integrally with the holder; and a substrate having a conductive pattern arranged in a circular annular fashion, with the axis of said rotation body being applied as a center, around said rotation body and in sliding contact with the contact portions of said sliding pieces, said conductive pattern being mounted to said housing, wherein said rotation body is supported by said housing for displacement in a radial direction that is perpendicular to the axis of said rotation body, said engaging end of said operation shaft comprises either a groove or a projection that extends in a radial direction crossing at a right angle with the axis of said rotation body and in a first direction which crosses the axis of said rotation body, said engaging portion of said rotation body comprises a projection or a groove that extends in said first direction for engagement with said engaging end of said operation shaft, said engagement portion of said rotation body and said engagement end of said operation shaft are in engagement with each other so as to be displaceable relative to each other in said first direction but not displaceable in a radial direction crossing at a right angle with the axis of said rotation body and in a second direction which is perpendicular to said first direction, said contact portions are arranged so as to contact said conductive pattern at positions which are in the second direction, said rotation body is not displaced in a radial direction of its axis even if said operation shaft is displaced in said first direction, and said rotation body is displaced in said second direction when said operation shaft is displaced in said second direction, said contact portions are moved in said second direction along with the former displacement and the segments of said contact portions contacted with said conductive pattern move on said conductive pattern in a diameter direction of said conductive pattern.

9. A rotary sensor according to claim 8, wherein there is formed in said rotation body a groove into which a plate-like protrusion formed at a forward end of the operation shaft whose rotation angle is to be detected is inserted, the groove forming the engagement portion of said rotation body.

10. A rotary sensor according to claim 9, wherein said groove is formed by a pair of walls opposed to each other with the center of rotation of said rotation body therebetween.

11. A rotary sensor according to claim 8, wherein there is formed in said rotation body a plate-like protrusion which is to be inserted into a groove formed at the forward end of the shaft whose rotation angle is to be detected, the protrusion forming the engagement portion of said rotation body.

12. A rotary sensor according to claim 8, wherein there is provided in said housing a bearing portion for pivotally supporting a lower end of said rotation body.

13. A rotary sensor according to claim 12, wherein there is provided between the housing and the rotation body an elastic member bringing the lower end of said rotation body into elastic contact with the bearing of said housing.

* * * * *

UNITED STATES PATENT AND TRADEMARK OFFICE
CERTIFICATE OF CORRECTION

PATENT NO. : 6,445,278 B1
DATED : September 3, 2002
INVENTOR(S) : Hirofumi Okumura It is certified that error appears in the above-identified patent and that said Letters Patent is hereby corrected as shown below:

<u>Title page,</u>
Item [56], FOREIGN PATENT DOCUMENTS, delete "4/1999" and substitute
-- 4/1989 -- in its place.
Item [57], ABSTRACT,
Line 7, delete "an groove" and substitute -- a groove -- in its place.

Signed and Sealed this

Sixth Day of May, 2003

JAMES E. ROGAN
*Director of the United States Patent and Trademark Office*